(12) United States Patent
Cain

(10) Patent No.: US 6,680,934 B1
(45) Date of Patent: Jan. 20, 2004

(54) SYSTEM, DEVICE AND METHOD FOR EXPEDITING CONTROL FLOW IN A COMMUNICATION SYSTEM

(75) Inventor: Bradley Cain, Cambridge, MA (US)

(73) Assignee: Nortel Networks Limited (CA)

( * ) Notice: Subject to any disclaimer, the term of this patent is extended or adjusted under 35 U.S.C. 154(b) by 0 days.

(21) Appl. No.: 09/453,339

(22) Filed: Dec. 2, 1999

(51) Int. Cl.$^7$ ................................................ H04L 12/66
(52) U.S. Cl. ........................ 370/352; 370/352; 370/410; 370/522; 370/524
(58) Field of Search ................................ 370/352, 410, 370/412, 469, 522, 524

(56) References Cited

U.S. PATENT DOCUMENTS

| | | | |
|---|---|---|---|
| 5,535,200 A | * | 7/1996 | Gardner ........................ 370/60 |
| 6,349,100 B1 | * | 2/2002 | Christie et al. ............. 370/401 |
| 6,463,052 B1 | * | 10/2002 | Christie ....................... 370/352 |

OTHER PUBLICATIONS

Hill and Associates, "The Internet, TCP/IP, and Routing", pp. 19D.4.5–19D.4.18.*
Travis Russell, Signaling System #7, 1998, McGraw Hill Telecommunications, Second Edition, pp. 109–116.*

\* cited by examiner

*Primary Examiner*—Douglas Olms
*Assistant Examiner*—Robert W. Wilson
(74) *Attorney, Agent, or Firm*—Steubing McGuinness & Manaras LLP

(57) ABSTRACT

A system, device, and method for expediting control flow in a communication system involves establishing a separate control channel for high priority control messages between two network nodes and exchanging high priority control messages over the control channel. The control channel may be a physical or virtual channel. Within a particular network node, a separate high priority queue is used for transferring high priority control messages between a control plane and a forwarding plane.

24 Claims, 4 Drawing Sheets

SYSTEM, DEVICE AND METHOD FOR EXPEDITING CONTROL FLOW IN A COMMUNICATION SYSTEM

FIELD OF THE INVENTION

The present invention relates generally to communication systems, and more particularly to expediting control flow between nodes in a communication system.

BACKGROUND OF THE INVENTION

In today's information age, communication networks are often used for interconnecting computers and computer peripherals. A communication network typically includes a number of nodes that interoperate to route protocol messages. The various nodes in the communication network exchange various control messages in order to determine network routes and perform other control functions.

In order for the communication network to operate efficiently, it is necessary for certain control messages to be exchanged in a timely manner. For example, some routing protocols exchange link state advertisement control messages in order to distribute topology information to the nodes in the communication network. For another example, some routing protocols use "keep alive" control messages in order to determine the status of neighboring nodes. These and other high priority control messages must be received in a timely manner in order for the nodes to react appropriately to network conditions.

Unfortunately, the control messages are typically exchanged over the same communication paths as those used for routing other protocol messages. Therefore, receipt of the control messages can be delayed due to queuing behind preceding protocol messages, and control messages can be dropped along with certain protocol messages due to congestion or other reasons.

Thus, a mechanism for expediting control flow between nodes in a communication network is needed.

SUMMARY OF THE INVENTION

In accordance with one aspect of the invention, a separate control channel for high priority control messages is established between two network nodes, and high priority control messages are exchanged over the control channel. The control channel may be a physical or virtual channel. Within a particular network node, a separate high priority queue is used for transferring high priority control messages between a control plane and a forwarding plane.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

An embodiment of the invention expedites control messages between nodes in a communication network by establishing a separate control channel between a pair of nodes and exchanging control messages over the control channel. The control channel may be a separate physical communication link or a separate virtual circuit on a common communication link. Each node maps the control channel to a high priority queue that is separate from a lower priority queue that is used for other protocol messages. Control messages exchanged over the control channel are queued on the high priority queue, and are processed ahead of the other protocol messages.

Figure 1:
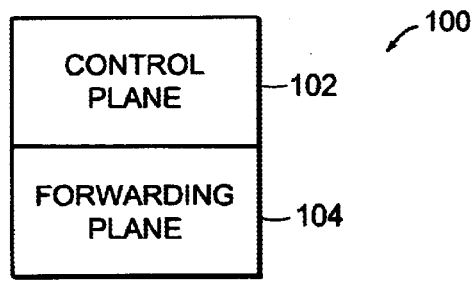
FIG. 1 is a block diagram showing an exemplary node in accordance with an embodiment of the invention.

FIG. 1 is a block diagram showing an exemplary node 100 in accordance with an embodiment of the invention. The node 100 is logically divided into a control plane 102 and a forwarding plane 104. The control plane 102 includes control software for managing the node 100 and for implementing various routing protocols that are used to establishing network routes. The forwarding plane 104 forwards protocol messages based upon network routes determined by the control plane 102, and also forwards control messages sent by the control plane 102 or destined for the control plane 102.

Figure 2:
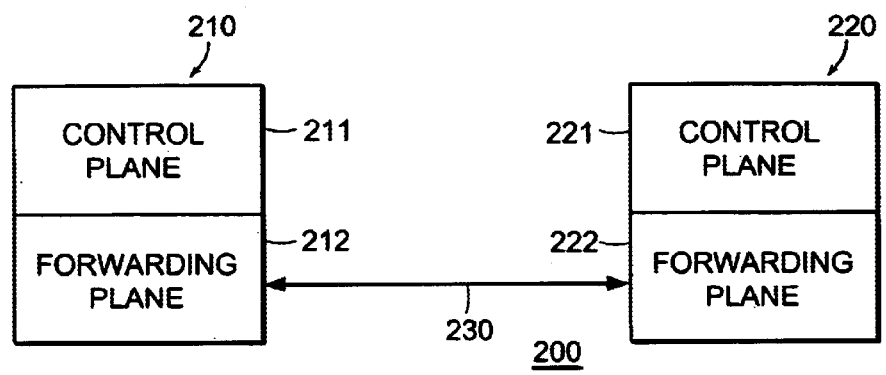
FIG. 2 is a block diagram showing an exemplary communication system as is known in the art.

FIG. 2 is a block diagram showing an exemplary communication system 200 as is known in the art. The communication system 200 includes, among other things, a first node 210 and a second node 220. The first node 210 includes a control plane 211 and a forwarding plane 212. The second node 220 includes a control plane 221 and a forwarding plane 222. The first node 210 and the second node 220 exchange control messages and other protocol messages over a communication channel 230.

Figure 3:
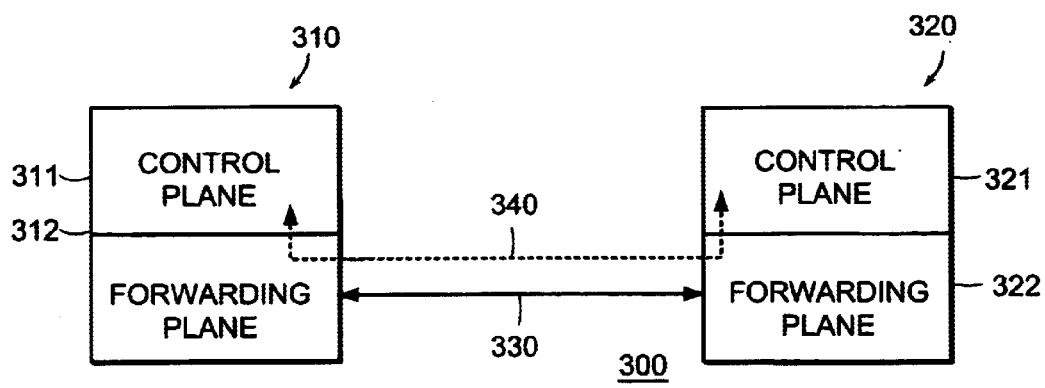
FIG. 3 is a block diagram showing an exemplary communication system including a separate control channel for exchanging high priority control messages in accordance with an embodiment of the invention.

FIG. 3 is a block diagram showing an exemplary communication system 300 including a separate control channel for exchanging high priority control messages in accordance with an embodiment of the invention. The communication system 300 includes, among other things, a first node 310 and a second node 320. The first node 310 includes a control plane 311 and a forwarding plane 312. The second node 320 includes a control plane 321 and a forwarding plane 322. The first node 310 and the second node 320 exchange high priority control messages over a control channel 340 and exchange other protocol message over a communication channel 330.

Within a particular node, the forwarding plane 104 forwards high priority control messages between the control plane 102 and the control channel 340. Thus, the forwarding plane 104 must be able to distinguish between high priority control messages and low priority control messages that are forwarded by the control plane 102 in order to forward the high priority control messages over the control channel 340. Also, the forwarding plane 104 must be able to expedite high priority control messages that are received over the control channel 340 to the control plane 102.

In an exemplary embodiment of the invention, control messages are transferred between the control plane 102 and the forwarding plane 104 using two (2) queues, specifically a high priority queue and a low priority queue. The high priority queue is used for transferring high priority control messages between the control plane 102 and the forwarding plane 104. The low priority queue is used for transferring other control messages between the control plane 102 and the forwarding plane 104.

Figure 4:
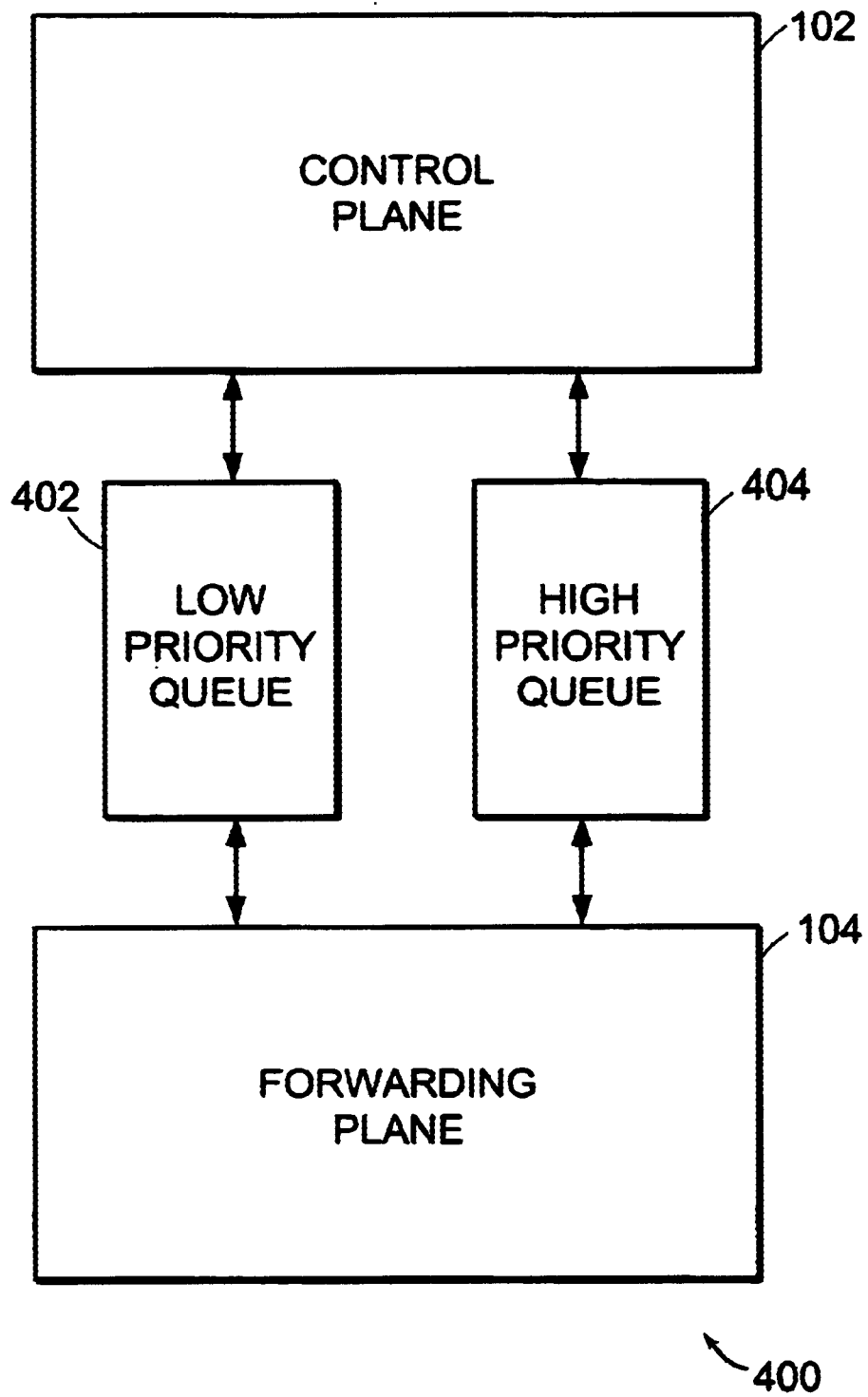
FIG. 4 is a block diagram showing the control plane coupled to the forwarding plane via a low priority queue and a high priority queue in accordance with an embodiment of the invention.

FIG. 4 is a block diagram 400 showing the control plane 102 coupled to the forwarding plane 104 via a low priority queue 402 and a high priority queue 404 in accordance with an embodiment of the invention. The high priority queue 404 is used for transferring high priority control messages between the control plane 102 and the forwarding plane 104. The low priority queue 402 is used for transferring other control messages between the control plane 102 and the forwarding plane 104.

Thus, when the control plane 102 needs to send a high priority control message, the control plane 102 places the high priority control message on the high priority queue 404. The forwarding plane 104 monitors both the low priority queue 402 and the high priority queue 404. When the forwarding plane 104 detects a high priority control message on the high priority queue 404, the forwarding plane 104 removes the high priority control message from the high priority queue 404, and forwards the high priority control message over the control channel 340. The forwarding plane 104 processes the high priority control message from the high priority queue 404 even if there are "older" control messages on the low priority queue 402.

Similarly, when the forwarding plane 104 receives a high priority control message over the control channel 340, the forwarding plane 104 places the high priority control message on the high priority queue 404. The control plane 102 monitors both the low priority queue 402 and the high priority queue 404. When the control plane 102 detects a high priority control message on the high priority queue 404, the control plane 102 removes the high priority control message from the high priority queue 404, and processes the high priority control message ahead of any control messages on the low priority queue 402.

Figure 5:
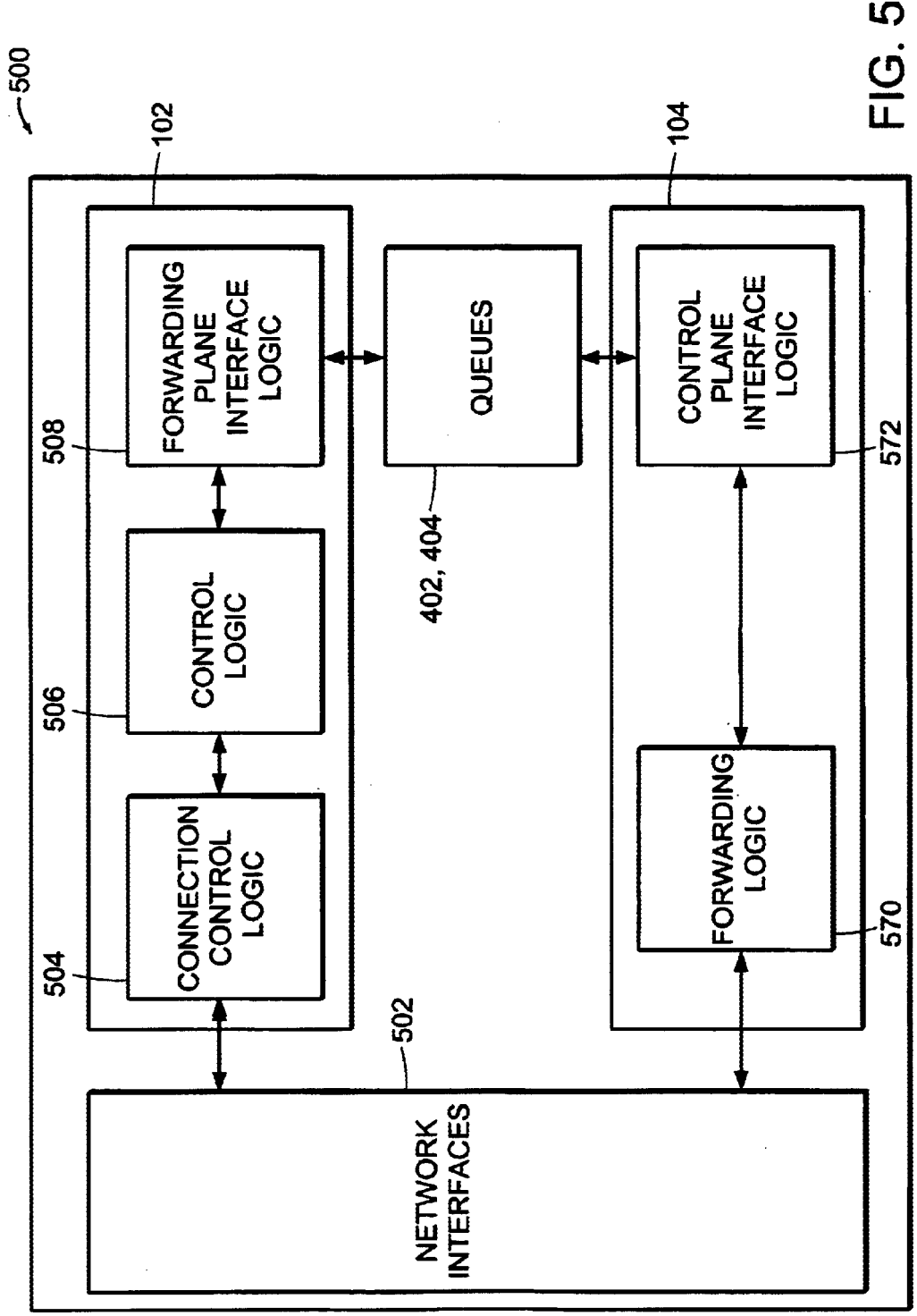
FIG. 5 is a block diagram showing a conceptual view of the relevant logic blocks of an exemplary node in accordance with an embodiment of the invention.

FIG. 5 is a block diagram showing a conceptual view of the relevant logic blocks of an exemplary node 500 in accordance with an embodiment of the invention. The node 500 includes, among other things, a plurality of network interfaces 502, the control plane 102, the high and low priority queues (402, 404), and the forwarding plane 104.

The control plane 102 includes, among other things, connection control logic 504, control logic 506, and forwarding plane interface logic 508. The connection control logic 504 establishes and maintains the control channel 340. The control logic 506 performs various control functions which typically involve generating and/or processing control messages. The forwarding plane interface logic 508 is coupled to the queues (402, 404) for interfacing the control plane 102 to the forwarding plane 104.

The forwarding plane 104 includes, among other things, forwarding logic 510 and control plane interface logic 512. The control plane interface logic 512 is coupled to the queues (402, 404) for interfacing the forwarding plane 102 to the control plane 104. The forwarding logic 510 is coupled to the network interfaces 502 and the control plane interface logic 512. Among other things, the forwarding logic 510 receives high priority control messages from the control plane 102 via the control plane interface logic 512, which obtains the high priority control messages from the high priority queue 404, and forwards the high priority control messages over the control channel 340. The forwarding logic 510 also receives high priority control messages over the control channel 340, and forwards the high priority control messages to the control plane 102 via the control plane interface logic 512, which in turn places the high priority control messages onto the high priority queue 404.

Figure 6:
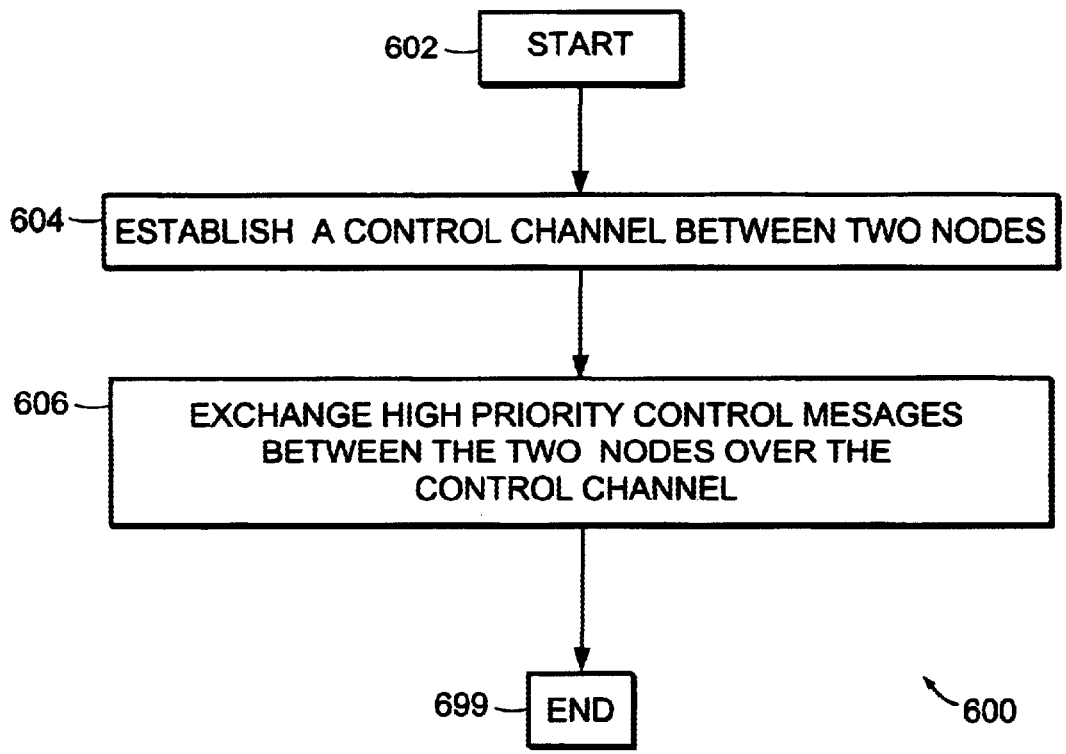
FIG. 6 is a logic flow diagram showing exemplary logic for expediting control flow in accordance with an embodiment of the invention.

FIG. 6 is a logic flow diagram showing exemplary logic 600 for expediting control flow in accordance with an embodiment of the invention. Beginning at step 602, the logic first establishes a control channel between two nodes, in step 604. The control channel may be a physical or virtual channel. For example, the control channel may be a Diff-Serve or ATM virtual circuit. The logic then exchanges high priority control messages between the two nodes over the control channel, in step 606. This typically involves mapping the control channel to a high priority queue and transferring high priority control messages between the control channel and the high priority queue. The logic 600 terminates in step 699.

In an exemplary embodiment of the present invention, predominantly all of the control plane logic is implemented as a set of computer program instructions that are stored in a computer readable medium and executed by an embedded microprocessor system within the node, and predominantly all of the forwarding plane logic is implemented in an Application Specific Integrated Circuit (ASIC).

Various embodiments of the invention may be implemented as a set of computer program instructions that are stored in a computer readable medium and executed by an embedded microprocessor system within the node. The set of computer instructions may be implemented in any conventional computer programming language. For example, an embodiment may be implemented in a procedural programming language (e.g., "C") or an object oriented programming language (e.g., "C++"). Alternative embodiments of the invention may be implemented using discrete components, integrated circuitry, programmable logic used in conjunction with a programmable logic device such as a Field Programmable Gate Array (FPGA) or microprocessor, or any other means including any combination thereof.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

The present invention may be embodied in other specific forms without departing from the essence or essential characteristics. The described embodiments are to be considered in all respects only as illustrative and not restrictive.

I claim:

1. A method for expediting control messages between a first node and a second node in a communication system, the method comprising:

for a given protocol, establishing between the first node and the second node a control channel independent of a communication channel used for routing protocol messages; and exchanging high priority control messages between the first node and the second node over the control channel, wherein the high priority control messages comprises keep alive control messages for a routing protocol.

2. The method of claim 1, wherein the control channel is a physical communication link.

3. The method of claim 1, wherein the control channel is a viral circuit.

4. The method of claim 1, further comprising mapping the control channel to a high priority queue by each of the first node and the second node.

5. The method of claim 4, wherein exchanging control messages between the first node and the second node over the control channel comprises:

sending a high priority control message by the first node to the second node over the control channel;

receiving the high priority control message by the second node over the control channel; and placing the high priority control message on the high priority queue by the second node.

6. The method of claim 1, wherein the high priority control messages comprise link state advertisement control messages for a routing protocol.

7. A device comprising:

control logic operably coupled to generate and process control messages for a given protocol;

connection control logic operably coupled to establish a control channel to another device for the given protocol, wherein the control channel is independent of a communication channel used for exchanging protocol messages with said other device; and forwarding logic operably coupled to transfer high priority control messages between the control channel and the control logic, wherein the high priority control messages comprises keep alive control messages for a routing protocol.

8. The device of claim 7, wherein the control channel is a physical communication link.

9. The device of claim 7, wherein the control channel is a virtual circuit.

10. The device of claim 7, wherein the control logic and the forwarding logic are operably coupled by a low priority queue and a high priority queue, and wherein the high priority control messages are transferred between the control logic and the forwarding logic over the high priority queue.

11. The device of claim 10, wherein:

the control logic causes a high priority control message to be placed on the high priority queue;

the forwarding logic causes the high priority control message to be removed from the high priority queue ahead of any protocol messages on the low priority queue; and the forwarding logic forwards the high priority control message over the control channel.

12. The device of claim 10, wherein:

the forwarding logic receives a high priority control message over the control channel;

the forwarding logic causes the high priority control message to be placed on the high priority queue; and the control logic causes the high priority control message to be removed from the high priority queue and processed ahead of any protocol messages on the low priority queue.

13. The device of claim 7, wherein the high priority control messages comprise link state advertisement control messages for a routing protocol.

14. A program product comprising a computer readable medium having embodied therein a computer program for expediting control flow in a network node, the computer program comprising:

control logic programmed to generate and process control messages for a given protocol;

connection control logic programmed to establish a control channel to another device for the given protocol, wherein the control channel is independent of a communication channel used for exchanging protocol messages with said other device; and forwarding logic programmed to transfer high priority control messages between the control channel and the control logic, wherein the high priority control messages comprises keep alive control messages for a routing protocol.

15. The program product of claim 14, wherein the control channel is a physical communication link.

16. The program product of claim 14, wherein the control channel is a virtual circuit.

17. The program product of claim 14, wherein the control logic and the forwarding logic are operably coupled by a low priority queue and a high priority queue, and wherein the high priority control messages are transferred between the control logic and the forwarding logic over the high priority queue.

18. The program product of claim 17, wherein:

the control logic is programmed to cause a high priority control message to be placed on the high priority queue;

the forwarding logic is programed to cause the high priority control message to be removed from the high priority queue ahead of any protocol messages on the low priority queue; and the forwarding logic is programmed to forward the high priority control message over the control channel.

19. The program product of claim 17, wherein;

the forwarding logic is programmed to receive a high priority control message over the control channel;

the forwarding logic is programmed to cause the high priority control message to be placed on the high priority queue; and the control logic is programmed to cause the high priority control message to be removed from the high priority queue and processed ahead of any protocol messages on the low priority queue.

20. The program product of claim 14, wherein the high priority control messages comprise link state advertisement control messages for a routing protocol.

21. A communication system comprising a fir node and a second node, wherein, for a given protocol, the first node and the second node establish a control channel independent of a communication channel used for routing protocol messages and exchange high priority control messages over the control channel, wherein the high priority control messages comprises keep alive control messages for a routing protocol.

22. The communication system of claim 21, wherein the control channel is a physical communication link.

23. The communication system of claim 21, wherein the control channel is a virtual circuit.

24. The communication system of claim 21, wherein the high priority control messages comprise link state advertisement control messages for a routing protocol.

* * * * *